(12) United States Patent
Allison et al.

(10) Patent No.: US 6,911,193 B2
(45) Date of Patent: Jun. 28, 2005

(54) INTEGRATION OF MIXED CATALYSTS TO MAXIMIZE SYNGAS PRODUCTION

(75) Inventors: Joe D. Allison, Ponca City, OK (US); Sriram Ramani, Ponca City, OK (US); Daxiang Wang, Ponca City, OK (US); Tianyan Niu, Ponca City, OK (US); Yaming Jin, Ponca City, OK (US); Gloria I. Straguzzi, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 190 days.

(21) Appl. No.: 10/126,395

(22) Filed: Apr. 19, 2002

(65) Prior Publication Data

US 2003/0198592 A1 Oct. 23, 2003

(51) Int. Cl.$^7$ ................................................ C01B 3/26
(52) U.S. Cl. ..................... 423/651; 252/373; 422/190; 422/194
(58) Field of Search .......................... 423/418.2, 651; 252/373; 422/190, 194

(56) References Cited

U.S. PATENT DOCUMENTS 5,112,527 A * 5/1992 Kobylinski ................. 252/373
6,365,544 B2 4/2002 Herron et al. ............... 502/326
2002/0013227 A1 1/2002 Dindi et al. ................. 502/325

FOREIGN PATENT DOCUMENTS

GB 2274284 * 7/1994 ............ C01B/3/38

OTHER PUBLICATIONS

Gunardson, Harold, *Industrial Gases in Petrochemical Processing*, Ch. 2 "Synthesis Gas Manufacture," Marcel Dekker, Inc. Pub. (1998) (pp. 41–80).
Andrzej Cybulski and Jacob A. Moulijn cds., *Structured Catalysts and Reactors*, pp. 179–208, 599–615 (1998).
Maiya, P.S., et al., "Maximizing $H_2$ Production by Combined Partial Oxidation of $CH_4$ and Water Gas Shift Reaction," *Applied Catalysis A: General*, pp. 65–72 (2000).

* cited by examiner

*Primary Examiner*—Stanley S. Silverman
*Assistant Examiner*—Maribel Medina
(74) *Attorney, Agent, or Firm*—Conley Rose P.C.

(57) ABSTRACT

Embodiments include a method and apparatus for converting a hydrocarbon and oxygen feed stream to a product stream such as syngas, including multiple serially aligned reaction zones and multiple hydrocarbon feeds. The first reaction zone catalyzes the net partial oxidation of the feed hydrocarbon. The subsequent zones catalyze reactions such as the stream or dry reforming of hydrocarbons or the water gas shift reaction, depending on the stream composition in the vicinity of the zone, and the desired product stream composition.

11 Claims, 1 Drawing Sheet

INTEGRATION OF MIXED CATALYSTS TO MAXIMIZE SYNGAS PRODUCTION

CROSS REFERENCE TO RELATION APPLICATIONS

Not applicable.

STATEMENT REGARDING FEDERALLY SPONSORED RESEARCH

Not applicable.

TECHNICAL FIELD OF THE INVENTION

The present invention relates to a process for the preparation of synthesis gas, i.e., a mixture of carbon monoxide and hydrogen, from a hydrocarbon feedstock. Particularly, the present invention relates to using different catalyst systems in a single reactor to take advantage of advantageous properties and minimize the disadvantageous properties of the catalyst systems used.

BACKGROUND OF THE INVENTION

Large quantities of natural gas are available in many areas of the world, and natural gas is predicted to outlast oil reserves by a significant margin. However, a significant amount of natural gas is situated in areas that are geographically remote from population and industrial centers. The costs of compression, transportation, and storage make its use economically unattractive. To improve the economics of natural gas use, much research has focused on the use of methane, the main component of natural gas, as a starting material for the production of higher hydrocarbons and hydrocarbon liquids, which are more easily transported and thus more economical. The conversion of methane to higher hydrocarbons is typically carried out in two steps. In the first step, methane is converted into a mixture of carbon monoxide and hydrogen (i.e., synthesis gas or syngas). In a second step, the syngas is converted into the higher hydrocarbons.

Current industrial use of methane or natural gas as a chemical feedstock proceeds by the initial conversion of the feedstock to carbon monoxide and hydrogen by either steam reforming (the most widespread process), dry reforming, autothermal reforming, or catalytic partial oxidation. Examples of these processes are disclosed in GUNARDSON, HAROLD, *Industrial Gases in Petrochemical Processing* 41–80 (1998). An example of catalytic partial oxidation is shown in U.S. Published patent application Ser. No. 20020013227 to Dindi et al., both incorporated herein by reference for all purposes. Steam reforming, dry reforming, and catalytic partial oxidation proceed according to the following reactions respectively:

$$CH_4 + H_2O \leftrightarrow CO + 3H_2 \quad (1)$$

$$CH_4 + CO_2 \leftrightarrow 2CO + 2H_2 \quad (2)$$

$$CH_4 + \tfrac{1}{2}O_2 \rightarrow CO + 2H_2 \quad (3)$$

While currently limited as an industrial process, catalytic partial oxidation (CPOX) has recently attracted much attention due to significant inherent advantages, such as the fact that heat is released during the process, in contrast to the endothermic steam and dry reforming processes.

Unfortunately, the heat production during a CPOX reaction can be a mixed blessing. In a CPOX reactor, there often occurs a substantial number of undesirable reactions, such as the non-selective oxidation of methane (e.g. to products other than CO and $H_2$, for example, C, $CO_2$ and $H_2O$). Non-selective oxidation is much more exothermic than the desirable CPOX reaction ($CH_4 + \tfrac{1}{2}O_2 \rightarrow CO + 2H_2$) and produces much more heat. This excess heat can have undesirable consequences. For example, excess heat at the front of the reaction zone can sinter the catalyst, causing a loss of surface area and, consequently, a loss of catalytic activity. In addition, if carbon is produced by the non-selective reactions, coking can be a problem. This loss of catalytic activity can, in turn, lead to an increase in the rate of unselective reaction, causing an even quicker deactivation of the catalyst, thus perpetuating a spiral of deactivation.

In catalytic partial oxidation, the hydrocarbon feedstock is mixed with an oxygen source, such as air, oxygen-enriched air, or oxygen, and introduced to a catalyst at elevated temperature and pressure. When the feedstock comprises primarily methane, the approximately 2:1 $H_2$:CO molar ratio achieved is generally more useful for downstream systems than the $H_2$:CO ratio that is obtained from steam reforming. Furthermore, oxidation reactions are typically much faster than reforming reactions. This allows the use of much smaller reactors for catalytic partial oxidation processes. The syngas in turn may be converted to hydrocarbon products, for example, fuels boiling in the middle distillate range, such as kerosene and diesel fuel, and hydrocarbon waxes by processes such as the Fischer-Tropsch Synthesis. An example of Fischer-Tropsch systhesis is disclosed in U.S. Pat. No. 6,365,544 to Herron et al., incorporated herein by reference.

The selectivities of catalytic partial oxidation to the desired products, carbon monoxide and hydrogen, are controlled by several factors, but one of the most important of these factors is the choice of catalyst composition. In many instances, the most effective catalyst compositions include precious and/or rare earth metals. These expensive catalysts needed for catalytic partial oxidation processes often place these processes generally outside the limits of economic justification. Additionally, some of the most selective catalysts, such as Rh, are not thermally stable enough to withstand the heat generated by the non-selective oxidation reactions that are inevitably present even using highly selective catalysts.

Typically, petrochemical applications of syngas require a specific molar ratio of hydrogen to carbon monoxide, such as, for example, 1:1 or 2:1. Current commercial processes for syngas generally yield much higher ratios. In addition, in some instances it is desirable to have a product stream comprising hydrogen with little or no CO. Therefore, separation technology, by-product credits, and production techniques that can adjust the hydrogen to carbon monoxide ratio and increase the overall feed hydrocarbon conversion and CO and $H_2$ selectivity are important aspects of syngas production.

One such production technique which purports to increase the hydrogen ratio in the overall product stream is disclosed in MAIYA, P. S., et al., *Maximizing $H_2$ Production by Combined Partial Oxidation of $CH_4$ and Water Gas Shift Reaction*, 196 APPLIED CATALYSIS A: General 65–72 (2000) (Maiya et al.). MAIYA ET AL. discloses a two reactor system in which the first reactor is a methane partial oxidation reactor and the second reactor is a water gas shift (WGS) reactor that uses CO produced in the methane partial oxidation reactor as a feedstock (along with water) to produce hydrogen according to Equation 4:

$$CO + H_2O \rightarrow CO_2 + H_2 \quad (4)$$

This may seem a reasonable solution, but it requires a very large capital outlay in that two reactors, rather than one, are used. The present invention substantially alleviates the high cost of operating two reactors by its advantageous and surprising discovery that the reactions can take place in the same reactor.

SUMMARY OF THE PREFERRED EMBODIMENTS

Embodiments of the present invention combine different catalyst systems for syngas generation processes to take advantage of localized reactor conditions and produced byproducts, resulting in enhanced overall feedstock conversion and CO and $H_2$ selectivities. Additionally, some embodiments of the present invention will advantageously decrease the rate of catalyst deactivation and increase catalyst life.

Embodiments include a method of reacting a primary feed stream comprising a hydrocarbon (such as, by way of example only, methane or natural gas) and an oxygen containing gas (such as, by way of example only, substantially pure oxygen, oxygen-enriched air, or air), the method comprising: providing first and second serially aligned stacked reaction zones; providing a first supported catalyst (such as, by way of example only, rhodium) in the first reaction zone on a first catalyst support (such as, by way of example only, substantially spherical granules having a diameter of approximately 1 mm or monoliths); providing a second supported catalyst in the second reaction zone on a second catalyst support; and feeding the primary feed stream through the first and second reaction zones sequentially at reaction promoting conditions; wherein the first supported catalyst catalyzes primarily the net partial oxidation of the hydrocarbon; and wherein the second supported catalyst catalyzes primarily either the WGS reaction, net partial oxidation, steam reforming, or dry reforming.

Embodiments also may comprise an intermediate hydrocarbon feed stream between the first and the second serially aligned stacked reaction zones. The intermediate feed stream need not necessarily be the same as the intitial feed stream, but may be of a substantially different composition than the primary feed stream.

Another embodiment includes a method of reacting a primary feed stream comprising a hydrocarbon and an oxygen containing gas, the method comprising: providing first, second, and third serial aligned stacked reaction zones; providing a first supported catalyst (such as, by way of example only, rhodium) in the first reaction zone on a first catalyst support; providing a second supported catalyst in the second reaction zone on a second catalyst support; providing a third supported catalyst in the third reaction zone on a third catalyst support; and feeding the feed stream through the first, second, and third reaction zones sequentially at reaction promoting conditions; wherein the first supported catalyst catalyzes primarily the net partial oxidation of the hydrocarbons; wherein the second supported catalyst catalyzes primarily either the WGS reaction, net partial oxidation, steam reforming, or dry reforming; and wherein the third supported catalyst catalyzes primarily either the WGS reaction, net partial oxidation, steam reforming or dry reforming. An intermediate feed stream may be injected between the first and second reaction zones, between the second and third reaction zones, or both.

Another embodiment includes a method of reacting a primary feed stream comprising a hydrocarbon and an oxygen containing gas, the method comprising: providing first and second serially aligned stacked reaction zones; providing a first supported catalyst (such as, by way of example only, cobalt and chromium, rhodium, 2–20 wt % $Co_{0.2}Cr_{0.8}O_x$/0.1–2 wt % Rh/2–10 wt % Yb, or a stable crystalline structure such as a spinel or perovskite or any other suitable catalyst as is mentioned herein, any of which can be supported on, by way of example only, alumina or zirconia) in the first reaction zone; providing a second supported catalyst (such as, by way of example only, rhodium, rhodium and samarium, or a lanthanide metal or any other suitable catalyst as is mentioned herein) in the second reaction zone on a second catalyst support (such as, by way of example only, alumina or zirconia), wherein the second catalyst catalyzes primarily the net partial oxidation of the hydrocarbon; and feeding the primary feed stream through the first and second reaction zones sequentially at reaction promoting conditions.

Another embodiment includes a means for increasing the life of syngas catalyst system comprising: a feed stream comprising a hydrocarbon-containing gas (such as, by way of example only, natural gas) and an oxygen-containing gas (such as, by way of example only, substantially pure oxygen, oxygen-enriched air, or air); a first reaction zone comprising a highly thermally stable means for catalyzing the reaction of the feed stream to an effluent stream comprising synthesis gas (such as, by way of example only, cobalt and chromium, 2–20 wt % $Co_{0.2}Cr_{0.8}O_x$/0.1–2 wt % Rh/2–10 wt % Yb, or a stable crystalline structure such as a spinel or perovskite or any other suitable highly thermally stable catalyst as is mentioned herein, any of which can be supported on, by way of example only, alumina or zirconia); and a second reaction zone comprising a highly selective means for catalyzing the first reaction zone effluent stream to a product stream comprising synthesis gas (such as, by way of example only, rhodium, rhodium and samarium, or a lanthanide metal or any other suitable highly selective catalyst as is mentioned herein, any of which can be supported on, by way of example only, alumina or zirconia); wherein the feed stream is fed through the first reaction zone and second reaction zone in series at syngas reaction promoting conditions.

BRIEF DESCRIPTION OF THE DRAWINGS

For a more detailed description of the present invention, reference will now be made to the accompanying Figures, wherein.

DETAILED DESCRIPTION OF THE PREFERRED EMBODIMENTS

In a preferred embodiment of the present invention, a hydrocarbon and oxygen feed stream is fed over an initial CPOX catalyst system to produce syngas with some byproduct $H_2O$ and $CO_2$. The stream then passes over stacked secondary and optionally tertiary or quaternary or greater catalyst systems to take advantage of the byproducts by reaction with excess $CH_4$. Additionally, intermediate feed streams are optionally added between the reaction zones to provide additional hydrocarbon feedstock or other reactants if needed.

Figure 1:
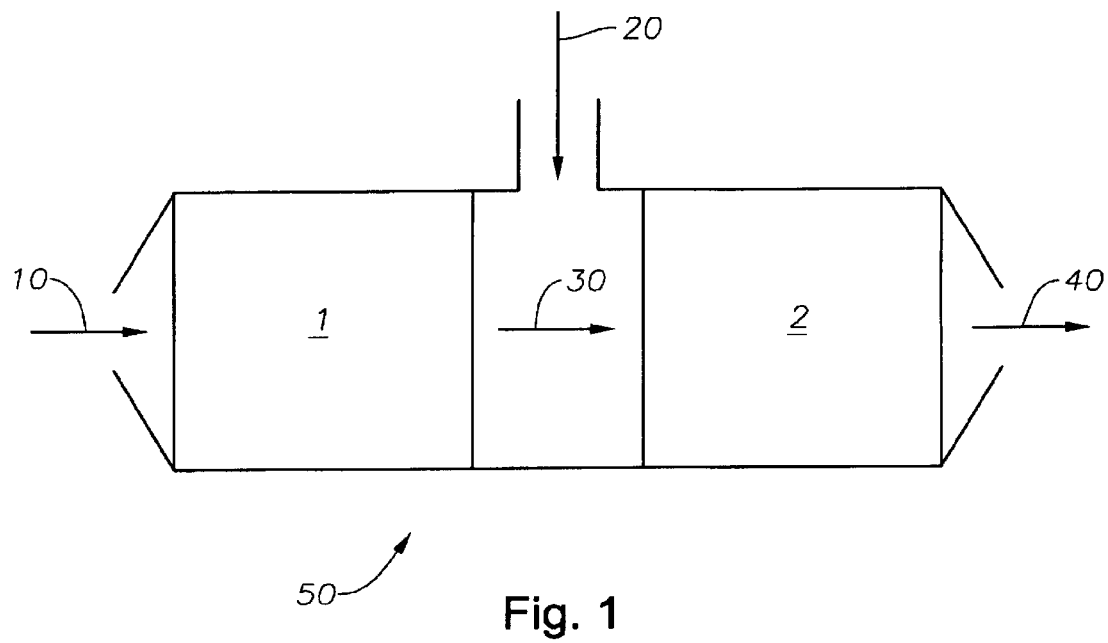
FIG. 1 is a first schematic embodiment of a reactor in accordance with the present invention.

There is shown in the Reactor 50 of FIG. 1, an embodiment comprising a feed stream 10, an intermediate stream 30, product 40, reaction zone 1, reaction zone 2, optional intermediate feed stream 20.

For example, in one embodiment of FIG. 1, feed stream 10 comprising hydrocarbon feedstock and an oxygen containing gas enters reactor 50 where it contacts a CPOX catalyst in reaction zone 1. A net partial oxidation occurs in zone 1, from which the primary products (in intermediate stream 30) are CO and $H_2$. Intermediate stream 30 may also comprise reaction byproducts that are products of secondary reactions. The byproducts may include, inter alia, $H_2O$ and $CO_2$. Intermediate stream 30 may also comprise unreacted oxygen and hydrocarbon feedstock. The relative quantities of reaction byproducts will depend on a number of factors including CPOX catalyst system composition and the conditions in reactor zone 1.

Intermediate stream 30 is then mixed with an optional intermediate feed stream 20 comprising hydrocarbon feedstock and then fed into stacked reaction zone 2, where it contacts a second catalyst system. According to a preferred embodiment, second catalyst system is chosen to optimize syngas production from the gas composition entering reaction zone 2. For example, if a substantial amount of $H_2O$ exits reaction zone 1, it may be advantageous to use a catalyst system in reaction zone 2 that catalyzes the steam reforming of methane to produce syngas from the $H_2O$ byproduct of reaction zone 1. Likewise, if a substantial amount of $CO_2$ exits reaction zone 1, it may be advantageous to use a catalyst system in reaction zone 2 that catalyzes the $CO_2$ reforming of methane. If it is desired to increase the amount of hydrogen in the product stream while decreasing the amount of CO, a WGS catalyst system may be used in reaction zone 2. Alternatively, it may be advantageous in some circumstances to place a second, different CPOX catalyst system in reaction zone 2.

Optional intermediate feed stream 20 may be used to feed additional hydrocarbon or another reactant into the reactor if necessary. For example, if the stream leaving reaction zone 1 contains a substantial amount of $H_2O$ and very little or none of the feed hydrocarbon, the presence of a steam reforming catalyst system in reaction zone 2 would not produce any substantial amount of the desired reaction because the $H_2O$ would have very little hydrocarbon with which to react. In such a case, it is preferred to introduce, a hydrocarbon in intermediate feed stream 20, so as to provide the necessary reactants in reactor zone 2. The hydrocarbon feedstock in intermediate feed stream 20 may be, but is not necessarily, the same composition as the hydrocarbon feed stock in feed stream 10. Likewise, if the stream leaving reaction zone 1 contains a substantial amount of unreacted hydrocarbon, but an insufficient amount of other reactants, such as $H_2O$ or $CO_2$, the desired reactant can be fed into the reactor upstream of reaction zone 2. Hence, stream 20 can be used to complete the stoichiometric requirements for the reaction that is desired to occur in zone 2.

After reacting in reaction zone 2, product stream 40 preferably comprises primarily CO and $H_2$ or primarily $H_2$ if a WGS catalyst is used in reaction zone 2, with very little unreacted hydrocarbon feedstock, oxygen-containing gases, $CO_2$, $H_2O$, or other gases.

In another embodiment of the system shown in FIG. 1, which is almost identical to the embodiment described immediately above, methane and oxygen are fed into reactor 50 as feed stream 10. Feed stream 10 enters reaction zone 1, which is filled with a catalyst, preferably a mixed metal oxide or a stable crystalline structure such as a spinel or perovskite, more preferably, $Co_{0.2}Cr_{0.8}$Oxide, more preferably 2–20 wt % $Co_{0.2}Cr_{0.8}$Oxide/0.1–2 wt % Rh/2–10 wt % Yb, and most preferably 9.9 wt % $Co_{0.2}Cr_{0.8}$Oxide/1 wt % Rh/6.1 wt % Yb supported on a refractory support such as alumina or zirconia, preferably partially stabilized zirconia (PSZ). The feed stream 10 reacts, exits reaction zone 1 as intermediate stream 30, and is then fed to reaction zone 2, which comprises a second catalyst. Preferably the second catalyst is a Rh catalyst, most preferably Rh—Sm supported on a refractory support such as alumina or zirconia, preferably PSZ. The intermediate stream 30 then reacts in reaction zone 2 to form products 40.

Without being bound by a particular theory, it is expected that the use of a thermally stable catalyst especially at the front of the syngas reactor (e.g., in reaction zone 1) and the use of a more selective catalyst (which is often less thermally stable) at the rear of the reactor (e.g., in reaction zone 2) will advantageously increase the life and overall productivity of the catalyst. It is believed that a large portion of the undesirable but inevitable non-selective reactions that occur in the syngas reactor occur at the front of the reaction zone. Additionally, the presence of the undesirable byproducts (e.g., $H_2O$ and $CO_2$) in the stream as it flows through the reactor causes endothermic reforming reactions to occur, which moderate the temperature further down the bed. As noted above, these non-selective reactions are highly exothermic and produce large amounts of heat. Some of the more highly selective catalysts, such as rhodium, are not able to withstand the heat and retain their activity due to problems such as sintering and a limited tolerance to carbon deposition. Thus, the present invention provides advantage inasmuch as it places more thermally stable catalyst, such as a mixed metal oxide such as $Co_{0.2}Cr_{0.8}$Oxide, at the front of the reactor, even if that more thermally stable catalyst is less selective because the decrease in selectivity at the front of the reactor is outweighed by the increase in the life of the more selective catalyst at the rear of the reactor. The result is an increase in the overall catalyst life of the entire reactor system. Thus, in the example of a $Co_{0.2}Cr_{0.8}$Oxide catalyst at the front of the reactor followed by a Rh/Sm catalyst at the rear of the reactor, the $Co_{0.2}Cr_{0.8}$Oxide catalyst would catalyze the desired CPOX reaction, albeit less selectively, and absorb the brunt of the heat generated by the inevitable nonselective side reactions. Additionally, the $H_2O$ and $CO_2$ produced at the front of the reactor by the non-selective oxidations are anticipated to perform reforming reactions with some of the methane in the rear of the reactor. These reforming reactions act to moderate the heat in the rear of the reactor. Thus, the temperatures at the rear of the reactor are not as severe, and the less thermally stable and more selective catalyst (e.g., Rh/Sm) can be used which will deactivates much less quickly.

Figure 2:
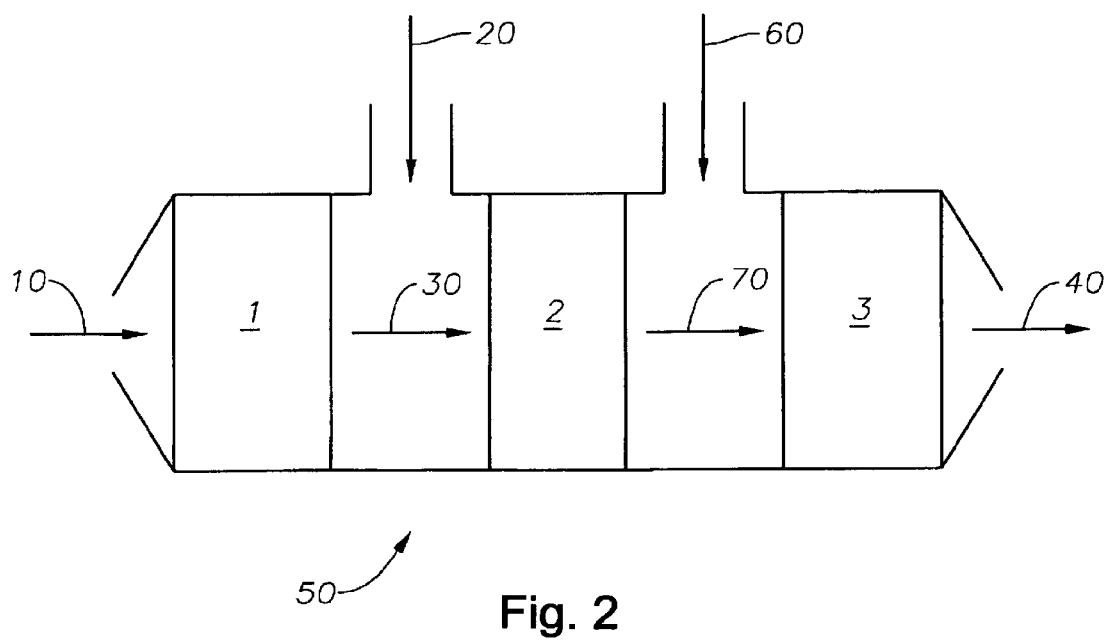
FIG. 2 is a second schematic embodiment of a reactor in accordance with the present invention.

Referring now to FIG. 2, there is shown a schematic preferred embodiment of a reactor in accordance with the present invention having three reaction zones 1, 2, and 3, feed stream 10, first intermediate stream 30, second intermediate stream 70, product stream 40, and two optional intermediate feeds 20 and 60. The operation is similar to the reactor of FIG. 1. Hydrocarbon and oxygen feed 10 feeds into reaction zone 1. The first intermediate product stream 30 is then optionally combined with intermediate hydrocarbon feed 20 and fed into reaction zone 2. As in FIG. 1, reaction zone 2 contains a catalyst system to utilize the undesired byproducts of reaction zone 1 to produce desirable products. Likewise, reaction zone 3 contains a catalyst to utilize the undesirable byproducts of reaction zone 2 and to produce desirable products therefrom. Specifically, as an example, intermediate stream 30 preferably contains primarily CO and $H_2$, but may also comprise unreacted hydrocarbons, $H_2O$, and $CO_2$. If needed, intermediate feed stream 20 may inject more hydrocarbons or other reactants into the reactor upstream of reaction zone 2. Reaction zone 2 may contain a water gas shift catalyst, a CPOX catalyst, a steam reforming catalyst, or a $CO_2$ reforming catalyst. The decision of which catalyst to include is within the skill of one of ordinary skill in the art based upon factors such as, for example, desired product 40 composition, catalyst cost, catalyst performance, reactor conditions, and intermediate stream 30 composition.

The second intermediate product stream 70 exits reaction zone 2, is optionally combined with a second optional intermediate feed stream 60 and fed into reaction zone 3. The choice of catalyst system for reaction zone 3 is governed by the same factors as the choice for reaction zone 2, although reaction zones 2 and 3 do not necessarily contain the same catalyst system. In fact, it is contemplated that due to the expected differences in the composition and physical properties (e.g., temperature) of streams 30 and 70, different catalyst systems will preferably be used in zones 2 and 3. For example, zone 2 may be designed to catalyze steam reforming and zone 3 may be designed to catalyze $CO_2$ reforming or vice-versa. In another example, zone 2 may be designed to catalyze a water gas shift reaction, and zone 3 may be designed to catalyze $CO_2$ reforming or vice versa. In yet another example, zone 2 may be designed to catalyze a water gas shift reaction, and zone 3 may be designed to catalyze steam reforming or vice versa.

Utilization of either the endothermic steam reforming or dry reforming processes may also moderate the heat of reaction given off by the exothermic CPOX.

Although FIGS. 1 and 2 disclose reactors with two and three reaction zones respectively, it is contemplated that reactors with more than three reaction zones are feasible and fall within the scope of the present invention. It will also be understood by one of ordinary skill in the art that the intermediate zones through which intermediate streams flow are not of any particular size. In fact, especially in embodiments where no intermediate feed (e.g., intermediate feed 20 of FIG. 1) is injected, the gap between adjacent reactor zones is generally preferably zero or as small as possible. In fact, it is also contemplated that there is not necessarily a distinct and discrete beginning and end to adjacent reaction zones. For example, it is contemplated that in some situations it will be advantageous for the transition from one reaction zone to an adjacent reaction zone to be a gradient, such that the catalyst system of one reaction zone is phased out as the catalyst system of the next reaction zone is phased in.

The term "catalyst system" as used herein means any acceptable system for catalyzing the desired reaction in the reaction zone. By way of example only, a CPOX catalyst usually includes a support and a catalyst. The support may be, for example, particulates, pills, beads, granules, pellets, rings, monoliths, ceramic honeycomb structures, wire gauze, or any other suitable supports in any acceptable manufactured shape such as those listed herein. Additionally, multiple supports may be used; for example, one zone may contain one support and another zone may contain a different type or composition support. The CPOX catalyst may be selected from the group consisting of nickel, samarium, rhodium, cobalt, platinum, rhodium-samarium, platinum-rhodium Ni—MgO, Group VIII metals, nickel-based catalysts, combinations thereof, or any other catalysts mentioned herein or as is well known in the art. As with the supports, multiple catalysts may be used; for example one zone may comprise one catalyst and another zone may comprise a second different catalyst. The above-exemplified examples of supports and catalysts are only examples. There are a plethora of catalysts systems known in the art that would be acceptable and are contemplated to fall within the scope, such as those disclosed in STRUCTURED CATALYSTS AND REACTORS 179–208, 599–615 (Andrzej Cybulski and Jacob A. Moulijn eds. 1998), incorporated herein by reference for all purposes.

For the purposes of this disclosure, the term "net partial oxidation reaction" means that the partial oxidation reaction shown in Reaction (3), above, predominates. However, other reactions such as steam reforming (Reaction (1)), dry reforming (Reaction (2)) and/or water-gas shift (Reaction (4)) may also occur to a lesser extent.

For the purposes of this disclosure, reaction zones are "stacked" if they are within the same reactor. Stacked reaction zones may be immediately adjacent to each other without any intervening space or object, or they may be separated by an intervening space or object.

Without further elaboration, it is believed that one skilled in the art can, using the description herein, utilize the present invention to its fullest extent. The embodiments herein are to be construed as illustrative, and not as constraining the disclosure in any way whatsoever.

What is claimed is:

1. A method of reacting a primary feed stream comprising a hydrocarbon and an oxygen containing gas, the method comprising:
   providing first and second serially aligned stacked reaction zones;
   providing a first catalyst in the first reaction zone;
   providing a second catalyst in the second reaction zone, wherein the second catalyst catalyzes primarily the net partial oxidation of the hydrocarbon; and feeding the primary feed stream through the first and second reaction zones sequentially at reaction promoting conditions;
   wherein the first catalyst comprises cobalt and chromium.

2. The method of claim 1 wherein the first catalyst further comprises rhodium.

3. The method of claim 1 wherein the first catalyst comprises about 2–20 wt % $Co_{0.2}Cr_{0.8}$Oxide.

4. The method of claim 3 wherein the first catalyst further comprises about 0.1–2 wt % Rh.

5. The method of claim 4 wherein the first catalyst further comprises about 2–10 wt % Yb.

6. The method of claim 5 wherein the first catalyst further comprises about 9.9 wt % $Co_{0.2}Cr_{0.8}$Oxide, about 1 wt % Rh, and about 6.1 wt % Yb.

7. The method of claim 1 further comprising a first intermediate feed stream for injecting a hydrocarbon, wherein the first intermediate feed stream is injected between the first and second reaction zones.

8. The method of claim 7 wherein the first intermediate feed stream is of a substantially different composition than the primary feed stream.

9. A means for partially oxidizing a hydrocarbon in a feed stream comprising a hydrocarbon-containing gas and an oxygen-containing gas, the means comprising;
   a first reaction zone comprising a highly thermally stable means for catalyzing the reaction of the feed stream to an effluent stream comprising synthesis gas; and
   a second reaction zone comprising a highly selective means for catalyzing the first reaction zone effluent stream to a product stream comprising synthesis gas; wherein the feed stream is fed through the first reaction zone and second reaction zone in series at syngas reaction promoting conditions;

wherein the highly thermally stable means for catalyzing comprises about 2–20 wt % CoCrOxide, about 0.1–2 wt % Rh, and about 2–10 wt % Yb.

10. The means of claim 9 wherein the highly selective means for catalyzing comprises rhodium and samarium.

11. The means of claim 9 wherein the highly thermally stable means for catalyzing comprises about 9.9 wt % CoCrOxide, about 1 wt % Rh, and about 6.1 wt % Yb.

* * * * *